May 1, 1951     S. PILE     2,551,546
FLEXIBLE CABLE
Filed Jan. 31, 1948
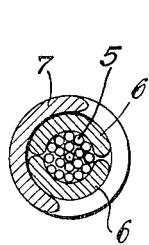
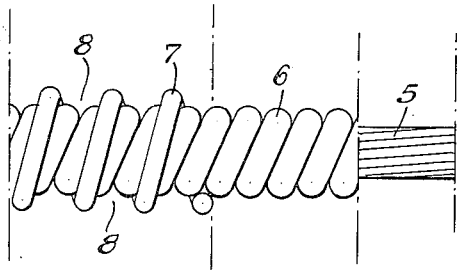
Fig. 2          Fig. 1
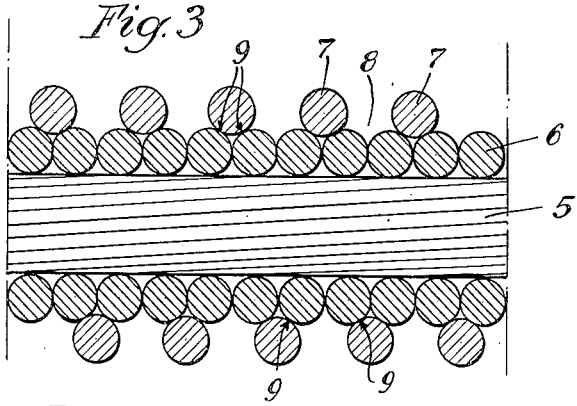
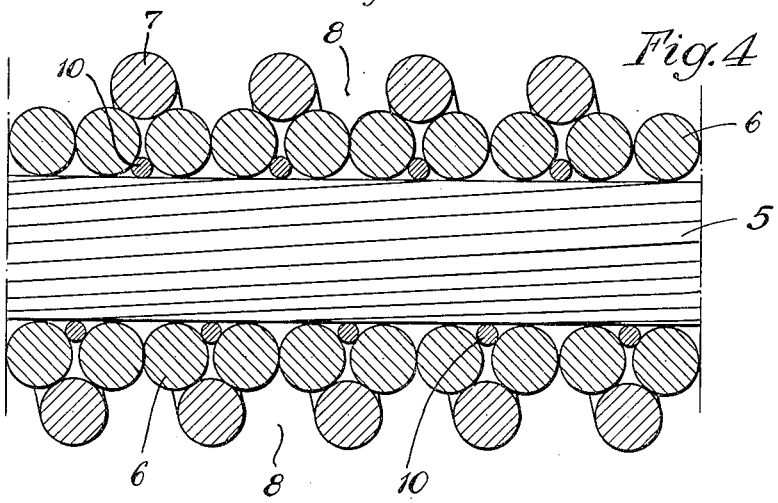
Inventor
Sydney Pile
by Singer, Ehlert, Stern & Carlberg
Attorneys Patented May 1, 1951

2,551,546

UNITED STATES PATENT OFFICE 2,551,546

FLEXIBLE CABLE

Sydney Pile, London, England, assignor to Teleflex Products Limited, London, England, a British company Application January 31, 1948, Serial No. 5,641
In Great Britain June 10, 1947

1 Claim. (Cl. 74—501)

This invention relates to flexible cables of the type having a multi-stranded tension transmitting core laid with a long pitch helix with one or more compression transmitting lays of comparatively small pitch wound thereon and which have on their exterior single spaced helical projections, and has for its object to provide such cables which readily are laid and of high axial thrust loading.

Flexible cables of the above type can be used for a variety of purposes, for instance for the transmission of "push and pull," as driving members, or again as transmission members in conveyor systems.

Previously it has been proposed, in the specification of United States Patent No. 1,983,962 (which deals with a flexible cable of the type to which the invention relates) in order to maintain the pitch of the helical projecting turns and to provide against axial displacement, to lay one or more spacing helices between said projecting turns.

The present invention is concerned with means whereby the pitch spacing of the projecting helical turns in cables of the type to which the invention relates is maintained and the axial thrust resisted with high efficiency without the employment of a spacing helix or helices.

In general, in accordance with the present invention the usual multi-stranded core is provided for the transmission of tension and this has wound thereon any desired number of compression transmitting lays of double- or other multi-start, which are of the same hand. The multi-start compression lay which comes on the outside has wound thereon to nest in certain of the helical recesses on its exterior surface, a helix of the same pitch and sense or hand, the wire of which is of suitable gauge so that when thus laid a helical groove is left between its turns, which turns constitute the spaced helical projections.

By the construction adapted the wires of the compression lay and the helical projections can be of the same or substantially the same diameter, thus to leave deep grooves of adequate width between the projecting helical turns.

It will be realised that the outermost wire having the same pitch as that of the helices of the outer compression lay, is so laid and wound that it nests in certain of the recesses on the exterior surface of this compression lay. Thus this outermost wire has two binding lines of contact throughout its length with the turns of the compression lay, which lines are below the maximum diameter of the latter lay. As a consequence, the outermost wire is securely anchored both circumferentially and axially and can take an axial thrust loading of a maximum extent and much greater than cables of the type to which the invention relates, as hitherto constructed.

In order that the invention may be better understood, it will now be described with reference to the accompanying drawings, which are given by way of example only. In the first place it must be stated that cables in accordance with the invention have various exterior diameters and for example can be from three-sixteenths of an inch up to, say five-eighths of an inch diameter, although of course the exterior diameter may be greater. In the description which follows, the cables concerned therewith are those which may be from three-sixteenths of an inch to, say, five-eighths of an inch exterior diameter.

In the drawings—

Fig. 1 shows a portion of a cable in elevation, one part of the figure showing the complete cable, one part showing the outer compression lay, and the other the core.

Fig. 2 is an end elevation of Fig. 1.

Fig. 3 shows to an enlarged scale a longitudinal axial section (except through the core) to an enlarged scale, of the cable shown in Fig. 1.

Fig. 4 shows a similar view to Fig. 3, but to a still further enlarged scale, of a modified method of construction.

In the method of carrying the invention into effect shown in Figs. 1, 2 and 3, the cable comprises a core 5 for the transmission of tension having wound thereon a two-start lay of circular section wires 6 of a certain hand in intimate bonding and binding contact therewith.

There is laid on this two-start lay 6 a single circular section wire 7 of the same pitch and diameter as the two-start lay 6. Thus it nests with and binds in alternate recesses on the exterior of this two-start lay 6, as clearly shown in Figs. 1 and 3.

As the diameters of the wires of the lay 6 and the wire 7 are equal it will be seen from the drawings there is a wide groove 8 left between the turns 7. Additionally it will be appreciated that the binding lines 9 where the wires 7 contact the turns 6 are continuous throughout.

As will be seen from Fig. 1, wires 6 are of double start and the pitch and the hand of the lay of the wire 7 are the same as that of the wires 6.

In some cases and especially in the case of cables of large diameter, it may very well be that the multi-start compression lay coming on the core 5 may have errors of pitch.

To accommodate these and give correction for the ultimate lay of the outer wire 7, there can be interposed between the two-start compression lay 6 a small fillet wire 10.

Thus, with this wire in position, the outer wire 7 coming thereabove can be given an accurate pitch relationship as in its lay it can accommodate itself to any variation in the lay of the wires 6.

What I claim and desire to secure by Letters Patent of the United States of America is:

A flexible cable comprising a multi-stranded tension transmitting core laid with a long pitch helix, a circular section wire multi-start compression-transmitting lay of comparatively small pitch wound around said core with the turns of the lay in contact, a fillet wire of comparatively small diameter laid around the core between certain of the turns of the compression-transmitting lay, and a helix of circular section wire of the same diameter as said first named circular section wire and having the same pitch and hand as the compression-transmitting lay, wound on the said compression-transmitting lay to nest in certain of the helical recesses on its exterior surface and to project beyond the said lay in such manner as to leave a groove between its own turns.

SYDNEY PILE.

REFERENCES CITED

The following references are of record in the file of this patent:

UNITED STATES PATENTS

| Number | Name | Date |
| --- | --- | --- |
| 969,660 | Schmidt | Sept. 6, 1910 |
| 2,067,815 | Barber | Jan. 12, 1937 |
| 2,401,100 | Pile | May 28, 1946 |

FOREIGN PATENTS

| Number | Country | Date |
| --- | --- | --- |
| 437,194 | Great Britain | Oct. 21, 1935 |